(12) United States Patent
Severson (10) Patent No.: US 11,616,348 B2
(45) Date of Patent: Mar. 28, 2023

(54) METHOD OF INSTALLING SPIRAL HANGERS ABOUT A MESSENGER LINE WHILE REMOVING LASHING WIRE

(71) Applicant: Karl Severson, Henderson, NV (US)

(72) Inventor: Karl Severson, Henderson, NV (US)

( * ) Notice: Subject to any disclaimer, the term of this patent is extended or adjusted under 35 U.S.C. 154(b) by 64 days.

(21) Appl. No.: 17/318,239

(22) Filed: May 12, 2021

(65) Prior Publication Data

US 2021/0265824 A1 Aug. 26, 2021

Related U.S. Application Data

(62) Division of application No. 16/009,618, filed on Jun. 15, 2018, now Pat. No. 11,038,322.

(51) Int. Cl.
| | | |
|---|---|---|
| *H02G 1/04* | (2006.01) | |
| *H02G 7/10* | (2006.01) | |
| *H02G 1/06* | (2006.01) | |
| *H02G 3/04* | (2006.01) | |
| *G02B 6/48* | (2006.01) | |
| *H02G 1/02* | (2006.01) | |

(52) U.S. Cl.
CPC ............. *H02G 1/04* (2013.01); *G02B 6/486* (2013.01); *H02G 1/06* (2013.01); *H02G 3/0456* (2013.01); *H02G 7/10* (2013.01); *H02G 1/02* (2013.01)

(58) Field of Classification Search
CPC .. H02G 7/10; H02G 1/04; H02G 1/02; H02G 1/06; H02G 3/0456; G02B 6/486
USPC .................... 254/134.3 CL, 134.3 R; 248/61
See application file for complete search history.

(56) References Cited

U.S. PATENT DOCUMENTS

| | | | |
|---|---|---|---|
| 1,454,559 A | | 5/1923 | Peach |
| 3,783,495 A | * | 1/1974 | Derrer ...................... H02G 1/02 |
| | | | 254/134.3 R |
| 3,814,383 A | | 6/1974 | Jackson |
| 5,727,777 A | | 3/1998 | Chikiri et al. |
| 5,979,880 A | | 11/1999 | Chikiri et al. |

(Continued)

FOREIGN PATENT DOCUMENTS

| | | |
|---|---|---|
| JP | 2000152449 | 5/2000 |
| JP | 2003189431 | 7/2003 |

(Continued)

OTHER PUBLICATIONS

Young, Lee W.; PCT Written Opinion of the International Search Authority; Aug. 27, 2019; pp. 5; Alexandria, Virginia.

*Primary Examiner* — Mahdi H Nejad
(74) *Attorney, Agent, or Firm* — Stetina Brunda Garred and Brucker (57) ABSTRACT

There is provided a method of installing spiral hangers about a messenger line installed between first and second utility poles with a cable being lashed to the messenger line with a lashing wire. The method includes attaching a first and second spiral hangers to the messenger line between first and second utility poles with the first spiral hanger disposed about the messenger line and the cable. The method includes removing the lashing wire from being around the messenger line and the cable adjacent the second spiral hanger. The method includes moving the second spiral hanger towards the second utility pole. The method includes attaching a successive spiral hanger to the messenger line between the spiral hangers, and repeating the moving of the second spiral hanger and attaching another successive spiral hanger.

7 Claims, 6 Drawing Sheets

(56) References Cited

U.S. PATENT DOCUMENTS

| | | | | |
|---|---|---|---|---|
| 6,595,492 B2* | 7/2003 | Penna | ............... | H02G 1/04 |
| | | | | 254/134.3 R |
| 6,646,208 B1 | 11/2003 | Tseng | | |
| 10,971,906 B2* | 4/2021 | Matsuo | ............... | H02G 1/04 |
| 11,038,322 B2* | 6/2021 | Severson | ............... | H02G 7/10 |
| 2019/0386471 A1* | 12/2019 | Severson | ............ | H02G 3/0456 |

FOREIGN PATENT DOCUMENTS

| | | | |
|---|---|---|---|
| JP | 200415888 | | 1/2004 |
| JP | 2004120816 | | 4/2004 |
| JP | 2004120816 A | * | 4/2004 |
| KR | 101198257 | | 11/2012 |

* cited by examiner

METHOD OF INSTALLING SPIRAL HANGERS ABOUT A MESSENGER LINE WHILE REMOVING LASHING WIRE

CROSS-REFERENCE TO RELATED APPLICATIONS

The present application is a divisional patent application of and claims priority to U.S. patent application Ser. No. 16/009,618, filed on Jun. 15, 2018, the entire contents of which are incorporated herein by reference.

STATEMENT RE: FEDERALLY SPONSORED RESEARCH/DEVELOPMENT

Not Applicable

BACKGROUND

1. Technical Field

The present disclosure relates generally to installation of spiral hangers for hanging cable on a messenger line. More particularly, the present disclosure relates to a method of installation of spiral hangers on a messenger line while removing a lashing wire.

2. Related Art

Aerial cables, overhead cables, or air cables are capable of transmitting electromagnetic signals or energy, and are mostly used for telecommunication systems or for power transmission, and is suspended above ground (typically supported by utility poles or pylons). As used herein the term cables is intended to be a broad term and may include cable television (CATV) cables, power lines, coaxial cables, fiber optic cables, telephone cables, traffic signal wiring, as example. In aerial applications, messenger lines run parallel to a transmission cable, and are used to structurally support the cable along its length. Messenger lines are typically steel cables and are attached to adjacent utility poles. Lashing is the process of attaching a cable to a messenger line using a lashing wire. Lashing wire may be a relatively thin stainless steel wire.

An alternative to the lashing process is the use of spiral hangers. A spiral hanger is a semi-flexible cable or rod in a spiral configuration that is defined by an inner diameter along a longitudinal axis. Examples of spiral hangers are disclosed in U.S. Pat. No. 5,727,777 entitled SPIRAL HANGER FOR A CABLE AND METHOD OF INSTALLING A CABLE USING THE SAME and U.S. Pat. No. 5,979,880 entitled METHOD FOR INSTALLATION OF SPIRAL HANGER FOR A CABLE. The spiral hangers sequentially attached to each other and are installed about a messenger line and a cable desired to be deployed. Multiple cables may be supported by a single set of spiral hangers installed over a single messenger line. The spiral hangers may be considered an aerial conduit for cables.

As new technologies are introduced into the market and updating of aging infrastructure is required, there is an ongoing need to install new cables. However, removal of old or non-used cables becomes an issue when taking into consideration pole loading and pole clearance, as well as aesthetics. Pole loading refers to the forces acting on a utility pole from the cables, hardware, environmental factors (e.g., wind, rain, ice, snow, etc.) and more. Pole loading analysis considers numerous factors, such as cable type, cable diameter, span-length between adjacent poles, cable angles, pole material types, cable attachment type, and the nature of power/communications equipment or hardware attached to the pole. Pole clearance refers to the vertical height requirement of attaching cables to a utility pole including, vertical height of a cable along its length. As more cables are added to existing poles using new messenger lines to support new cables, pole clearance becomes an issue with restrictions on height clearance above various objects, such as structures, walls, and vegetation (trees, bushes, etc.). However, the removal process of existing cables presents significant safety hazards in terms of personal injury and property damage.

In view of the foregoing, there is a need in the art for an improved method of installing spiral hangers from a messenger line.

BRIEF SUMMARY

In accordance with one embodiment, there is provided a method of installing spiral hangers about a messenger line installed between first and second utility poles. A cable is lashed to the messenger line with a lashing wire wrapped about the cable and the messenger line extending from the first utility pole to the second utility pole. The method includes attaching a first spiral hanger to the messenger line between the first utility pole and the second utility pole with the first spiral hanger disposed about the messenger line and the cable. The method further includes attaching a second spiral hanger to the messenger line between the first spiral hanger and the second utility pole with the second spiral hanger disposed about the messenger line and the cable. The method further includes removing the lashing wire from being around the messenger line and the cable adjacent the second spiral hanger between the second spiral hanger and the second utility pole. The method further includes moving the second spiral hanger towards the second utility pole. The method further includes attaching a successive spiral hanger to the messenger line between the first spiral hanger and the second spiral hanger with the successive spiral hanger disposed about the messenger line and the cable. The method further includes repeatedly repeating the steps of moving the second spiral hanger towards the second utility pole and then attaching a successive spiral hanger to the messenger line between the first spiral hanger and the second spiral hanger.

Advantageously, the method of this embodiment provides an efficient method of removing lashing wire while installing the spiral hangers through use of the existing messenger line. Because the spiral hangers are incrementally added while the lashing wire is incrementally removed, the existing cable(s) remain located adjacent the messenger line and supported during the entire spiral hanger installation process. Once the spiral hangers are installed, an existing cable may be easily and safely removed by cutting the cable and pulling it from within the spiral hangers at a single location, such as adjacent a single utility pole. This provides a safe and effective way to remove an existing cable without having to drop or lower the cable along its installed length (such as the entire distance spanning between utilities poles). Further, where there are multiple existing cables, one or more existing cables may be selectively removed while leaving those existing cables that are still in use. Moreover, the method of this embodiment provides an efficient method of installing a new cable while removing an existing cable or cables using an existing messenger line while mitigating pole overloading (too much weight on the utilities poles due to multiple cables and lines being attached) and avoiding negatively impacting pole clearance.

In accordance with various embodiments, the first spiral hanger may be attached to the messenger line adjacent to the first utility pole. The spiral hangers may be attached to the messenger line and the cable by wrapping the spiral hangers about the messenger line and the cable. Each of the spiral hangers define an inner diameter about a longitudinal axis, and the attaching of the spiral hangers to the messenger line may include the messenger line and the cable being disposed through the inner diameter of the first spiral hanger. The method of installing spiral hangers may further include attaching respective adjacent spiral hangers to each other. Each of the spiral hangers has opposing ends, and the attaching of respective adjacent spiral hangers to each other may include attaching the respective ends of respective adjacent spiral hangers to each other. The removing of the lashing wire may include cutting the lashing wire to form a first lashing wire segment and a second lashing wire segment. The first lashing wire segment extends to the second utility pole, and the second lashing wire segment extends to the first utility pole. The removing of the lashing wire may further include moving the second spiral hanger and the first lashing wire segment towards the second utility pole. The removing of the lashing wire may further include attaching a guide line to the messenger line adjacent to the first lashing wire segment, and pulling the guide line to move the first lashing wire segment towards the second utility pole. The removing of the lashing wire, the moving of the second spiral hanger, and the of attaching a successive spiral hanger may repeatedly continue until the spiral hangers substantially extend across the entirety of the messenger line between the first and second utility poles. The method of installing spiral hangers may further include removing the cable between the first and second utility poles from within the spiral hangers. The removing of the cable may include pulling the cable to slide the cable along and within the spiral hangers towards a respective one of the first or second utility poles. The method of installing spiral hangers may further include installing a second cable within the spiral hangers between the first and second utility poles.

According to another embodiment, there is provided a method of installing spiral hangers about a messenger line installed between first and second utility poles. A cable is lashed to the messenger line with a lashing wire wrapped about the cable and the messenger line extending from the first utility pole to the second utility pole. The method includes attaching a first spiral hanger to the messenger line between the first utility pole and the second utility pole with the first spiral hanger disposed about the messenger line and the cable. The method further includes attaching a successive spiral hanger to the messenger line between the first spiral hanger and the second utility pole with the successive spiral hanger disposed about the messenger line and the cable. The method further includes removing the lashing wire from being around the messenger line and the cable adjacent the successive spiral hanger between the successive spiral hanger and the second utility pole. The method further includes repeating the steps of attaching a successive spiral hanger and removing the lashing wire until the spiral hangers substantially extend across the entirety of the messenger line between the first and second utility poles.

According to various embodiments, the method may further include cutting the lashing wire to form a first lashing wire segment and a second lashing wire segment. The first lashing wire segment extends to the second utility pole, and the second lashing wire segment extends to the first utility pole. The method may further include moving the second lashing wire segment towards the second utility pole. The step of removing the lashing wire may include attaching a guide line to the messenger line adjacent to the first lashing wire segment, and pulling the guide line to move the first lashing wire segment towards the second utility pole. The method of installing spiral hangers may further include removing the cable between the first and second utility poles from within the spiral hangers. The step of removing the cable may include pulling the cable to slide the cable along and within the spiral hangers towards a respective one of the first or second utility poles. The method of installing spiral hangers may further include installing a second cable within the spiral hangers between the first and second utility poles.

The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The detailed description set forth below in connection with the appended drawings is intended as a description of certain embodiments of the present disclosure, and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present disclosure. It is further understood that the use of relational terms such as top and bottom, first and second, and the like are used solely to distinguish one entity from another without necessarily requiring or implying any actual such relationship or order between such entities.

Figure 1:
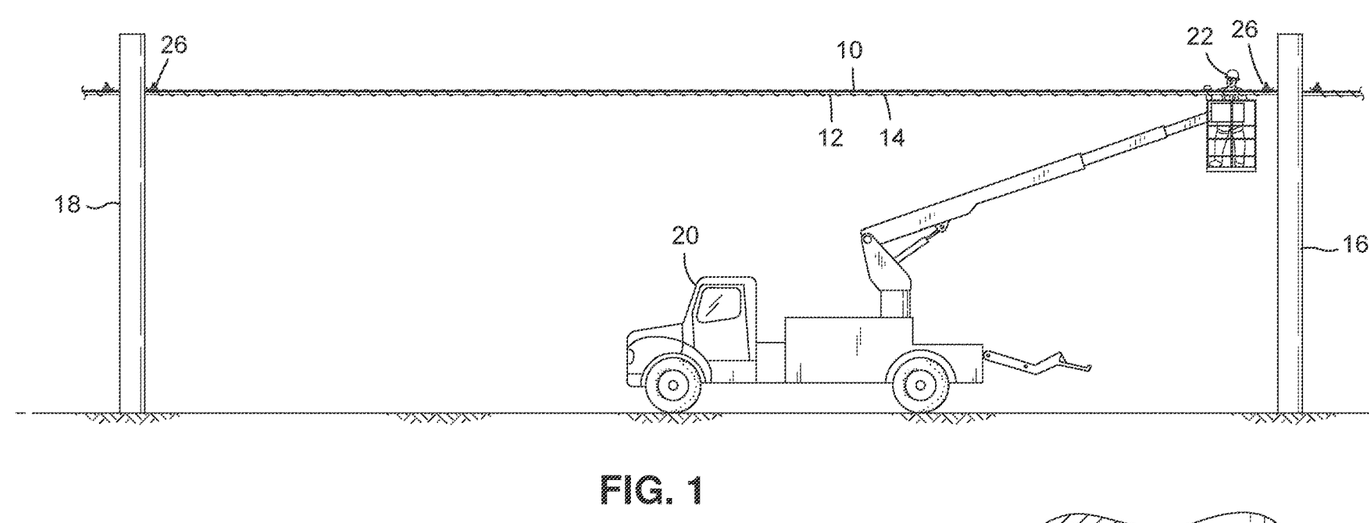
FIG. 1 is a side view schematically depicting a messenger line disposed with a cable lashed with a lashing wire between first and second utility poles with an utility truck and installer in a man-lift for showing an embodiment of the method of installing spiral hangers.
Figure 2:
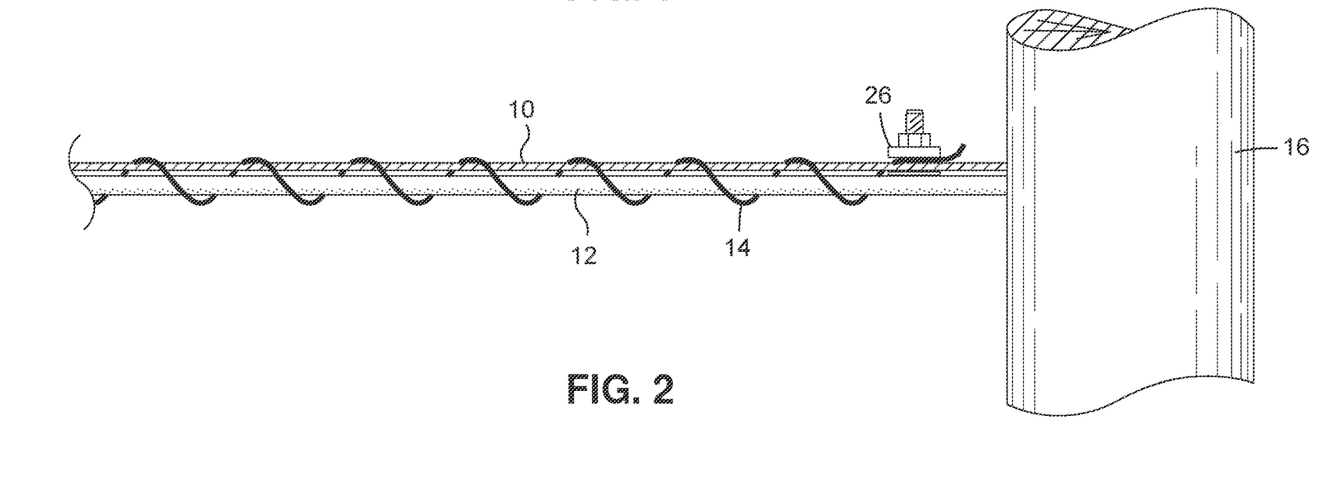
FIG. 2 is an enlarged view of a portion of the messenger line with the lashed cable adjacent the first utility pole of FIG. 1.

Referring now to FIG. 1 there is a side view schematically depicting a messenger line 10 disposed with a cable 12 lashed with a lashing wire 14 between first and second utility poles 16, 18 with a utility truck 20 and installer 22 in a man-lift 24. FIG. 2 is an enlarged view of a portion of the messenger line 10 with the lashed cable 12 adjacent the first utility pole 16 of FIG. 1. The lashing wire 14 may be attached to messenger line using clamps 26. It is contemplated the lashing wire 14 may be installed using conventional techniques that employ a rotating tool that spools the lashing wire 14 out while wrapping the cable 12 to the messenger line 10. The cable 12 is contemplated to be an existing cable and the methods of the embodiments contemplated herein are in the context of the need to install spiral hangers about an existing messenger line, such as messenger line 10. In this regard, there is no need to initially install any messenger line in the context of the present methods.

As used herein the terms cable and cables are intended to be broad terms and refer to cables, conduits, and lines that are capable of transmitting electromagnetic signals or energy and are mostly used for telecommunication systems or for power transmission. Cables may include, but not limited to, cable television (CATV) cables, power lines, coaxial cables, fiber optic cables, telephone cables, and traffic signal wiring, as examples. As used herein the term messenger lines refer to cables and lines that are capable of providing structural support of a cable along its length. Messenger lines are typically steel cables and are attached to adjacent utility poles. As used herein the term lashing wire refers to any line that may be used to wrap about a messenger line and cable and may be a relatively thin stainless steel wire for example. As used herein the term utility pole refers to any structural support, such as a pole or pylon made of any material (such as wood, concrete or metal) that is capable of vertically supporting a messenger line and a cable between adjacent utility poles.

Figure 3:
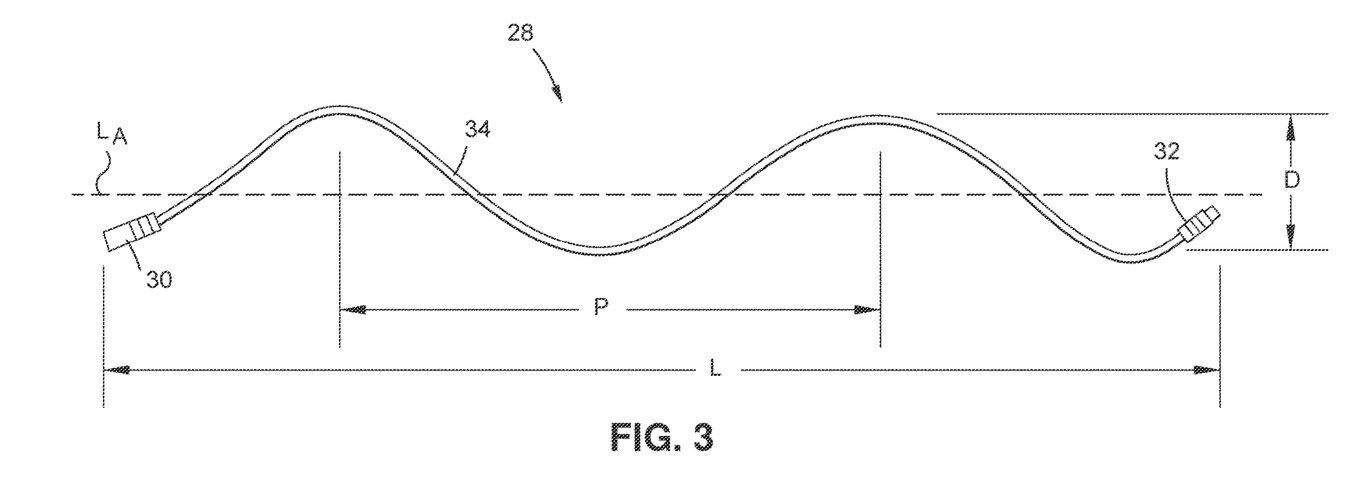
FIG. 3 is a side view of a spiral hanger.

FIG. 3 is a side view of a first spiral hanger 28. The first spiral hanger 28 may be characterized by a longitudinal axis "LA", a length "L", a pitch "P", and an inner diameter "D" about the longitudinal axis "LA". It is contemplated that the first spiral hanger 28 may have a variety of sizes for the length "L", pitch "P", and inner diameter "D", thickness and material type. The first spiral hanger 28 includes opposing first and second ends 30, 32 with a hanger body 30 disposed between the first and second ends 30, 32. While the first spiral hanger 28 is depicted as having a continuously smooth curvature, other configurations may be utilized which have relatively more abrupt bends and angular shaping.

Figure 4:
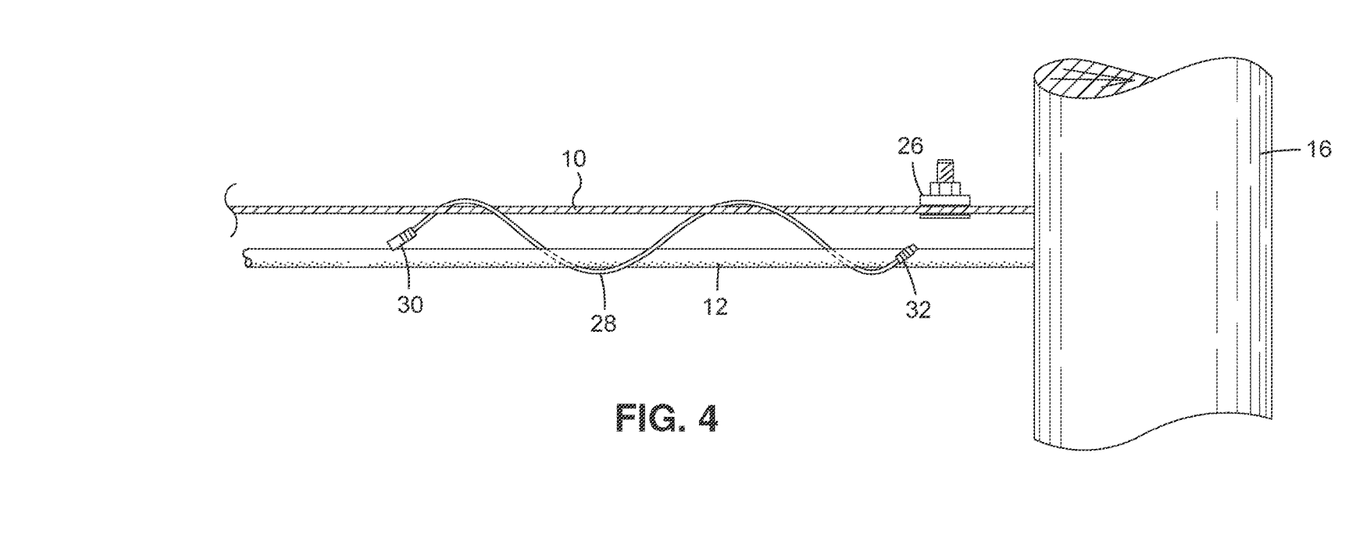
FIG. 4 is a side view of the messenger line of FIG. 2 with a first spiral hanger disposed about the messenger line and the cable.

In accordance with one embodiment, there is provided a method of installing spiral hangers about the messenger line 10 installed between the first and second utility poles 16, 18. The cable 12 is lashed to the messenger line 10 with a lashing wire 14 wrapped about the cable 12 and the messenger line 10 extending from the first utility pole 16 to the second utility pole 18. The method includes attaching the first spiral hanger 28 to the messenger line 10 between the first utility pole 16 and the second utility pole 18 with the first spiral hanger 28 disposed about the messenger line 10 and the cable 12. FIG. 4 depicts the first spiral hanger a wrapped about the messenger line 10 and the cable 12 (note that for ease of depiction of the first spiral hanger 28 the lashing wire 14 is not shown in this figure). It is contemplated that the installer 22 may spin the first wire hanger 28 onto the messenger line 10 and the cable 12 by rotating the first spiral hanger 28 about the longitudinal axis "LA" having the effect of the first end 30 revolving about the messenger line 10 and the cable 12 with the messenger line 10 and the cable 12 being disposed through the inner diameter D of the first spiral hanger 28.

Figure 5:
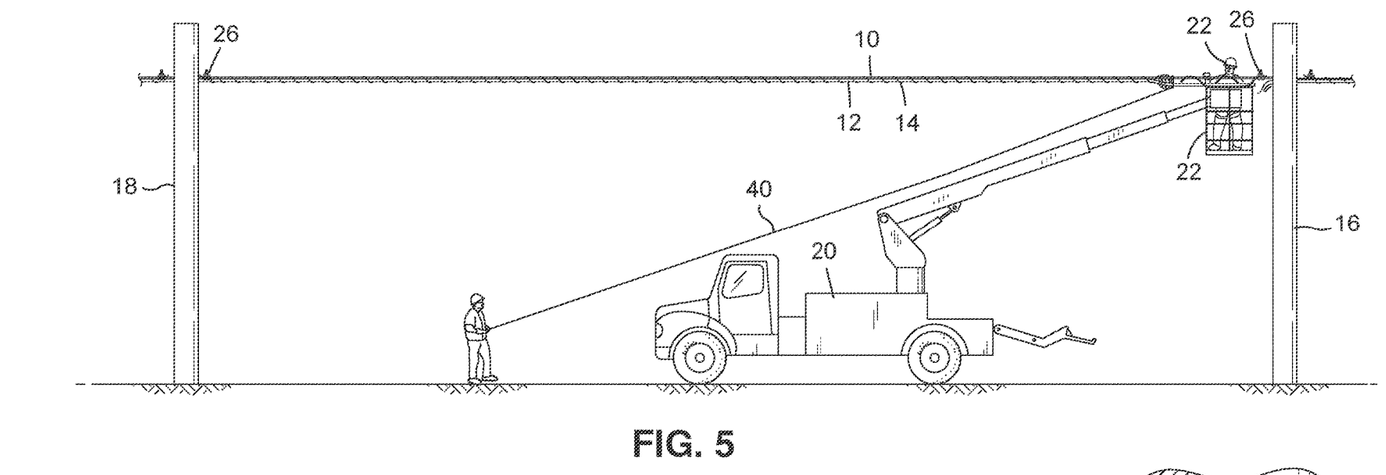
FIG. 5 is a side view similar to FIG. 1 with a portion of the lashing wire being removed and the first spiral hanger attached to the messenger line and the cable.
Figures 6, 7:
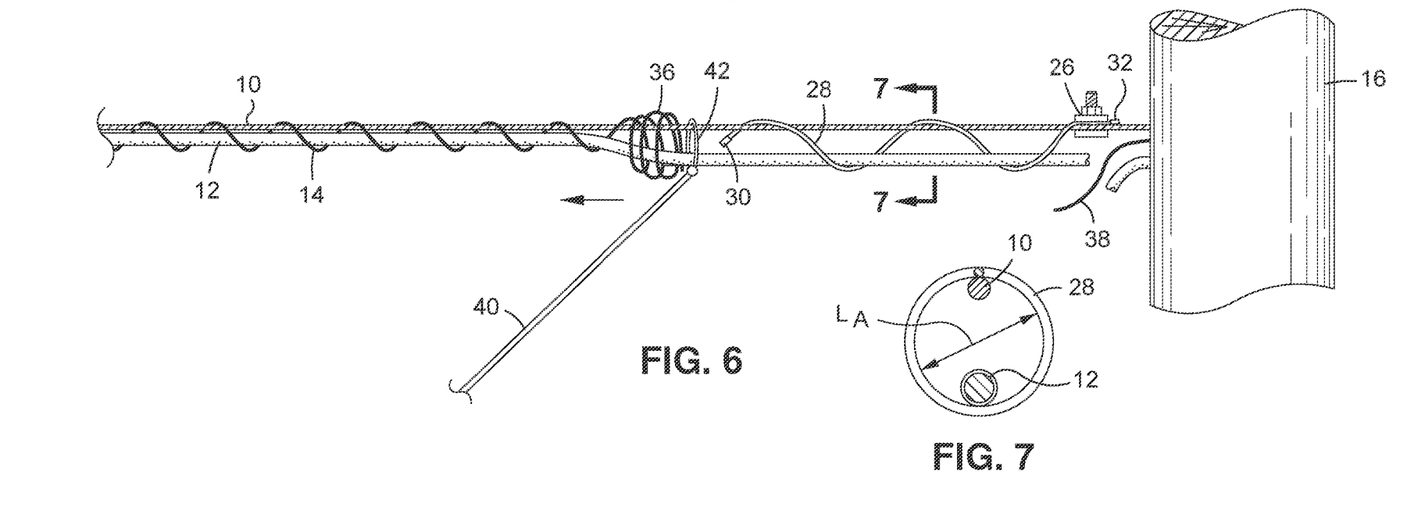
FIG. 6 is an enlarged view of a portion of the messenger line with the attached first spiral hanger and the lashing wire being partially removed using an attached guide line of FIG. 5.
FIG. 7 is a sectional view along axis 7-7 of FIG. 6 showing the cable attached to the messenger line using the first spiral hanger.

Referring now to FIG. 5 there is depicted a side view similar to FIG. 1 with a portion of the lashing wire 14 being removed from the messenger line 10 and cable 12 adjacent the first utility pole 16. FIG. 6 is an enlarged view of a portion of the messenger line 10 adjacent the first utility pole 16 of FIG. 5. The first spiral hanger 28 is attached is the messenger line 10 and the cable 12 in the section of the messenger line 10 adjacent the first utility pole where the lashing wire 14 has been partially removed. FIG. 7 is a sectional view along axis 7-7 of FIG. 6 showing the cable 12 attached to the messenger line 10 using the first spiral hanger 28.

Figure 8:
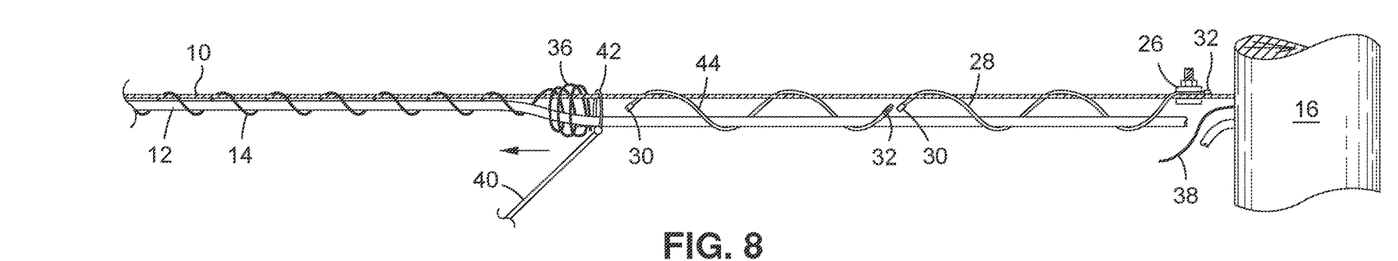
FIG. 8 is a side view similar to FIG. 6 with more lashing wire being removed and a second spiral hanger attached to the messenger line.

The method further includes attaching a second spiral hanger 44 to the messenger line 10 between the first spiral hanger 28 and the second utility pole 18 with the second spiral hanger 44 disposed about the messenger line 10 and the cable 12. In this regard, referring now to FIG. 8 there is depicted is a side view similar to FIG. 6 the second spiral hanger 44 attached to the messenger line 10. The method further includes removing the lashing wire 14 from being around the messenger line 10 and the cable 12 adjacent the second spiral hanger 44 between the second spiral hanger 44 and the second utility pole 18. In FIG. 8 the lashing wire 14 is removed from about the messenger line 10 towards the right in comparison to FIG. 6. This accommodates the attaching the second spiral hanger 44 to with messenger line 10 and the cable 12 without having to attach the second spiral hanger 44 over the lashing wire 14.

Figure 9:
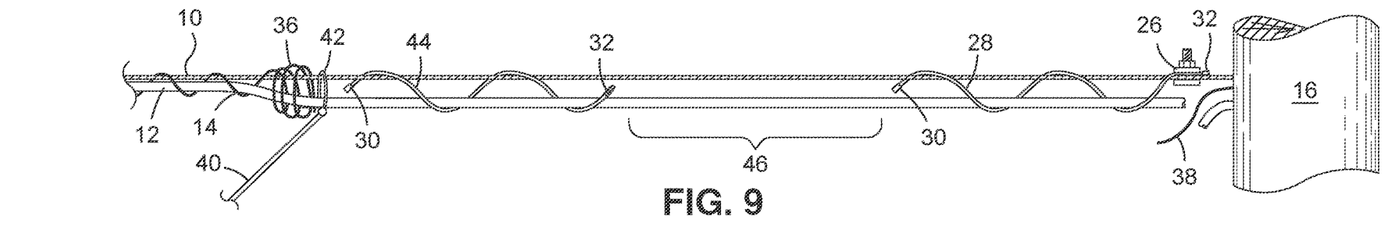
FIG. 9 is a side view similar to FIG. 8 with more lashing wire being removed and the second spiral hanger separated from the first spiral hanger.

Referring now to FIG. 9, there is depicted a side view similar to FIG. 8 with more lashing wire 14 being removed and the second spiral hanger 44 separated from the first spiral hanger 28 to form a gap 46. The method further includes moving the second spiral hanger 44 towards the second utility pole 18.

Figure 10:
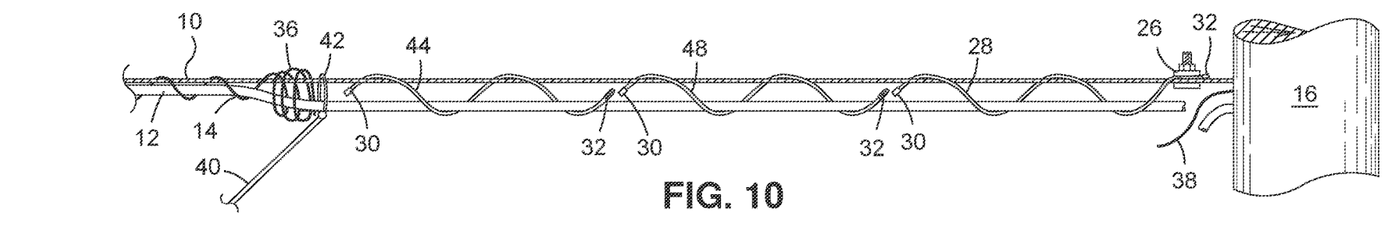
FIG. 10 is a side view similar to FIG. 9 with a successive spiral hanger attached to the messenger line between the first and second spiral hangers.
Figure 11:
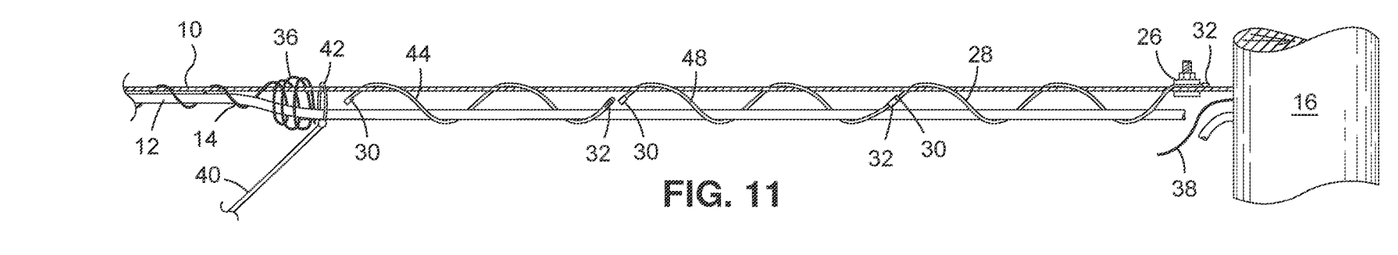
FIG. 11 is a side view similar to FIG. 10 with the successive spiral hanger connected to the first spiral hanger.

The method further includes attaching a successive spiral hanger 48 to the messenger line 10 between the first spiral hanger 28 and the second spiral hanger 44 with the successive spiral hanger 48 disposed about the messenger line 10 and the cable 12. FIG. 10 depicts a side view similar to FIG. 9 with the successive spiral hanger 48 attached to the messenger line 10 between the first and second spiral hangers 28, 44. FIG. 11 depicts a side view similar to FIG. 10 with the successive spiral hanger connected 48 to the first spiral hanger 28.

Figure 12:
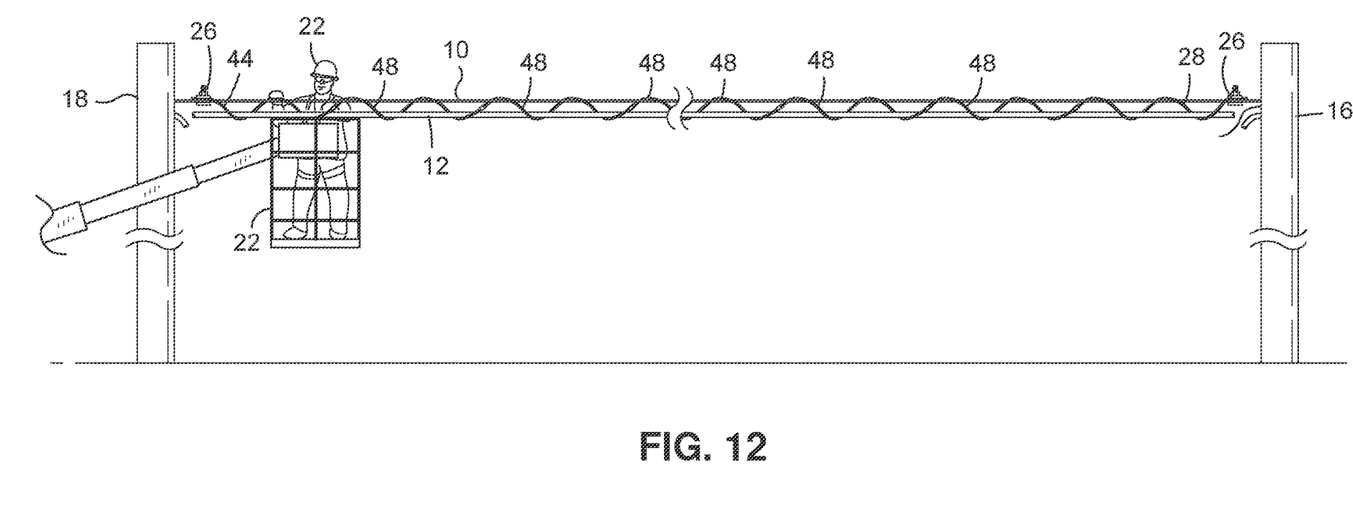
FIG. 12 is a side view schematically depicting a messenger line disposed within the cable attached using the spiral hangers between the first and second utility poles and with the cable being cut adjacent the first utility pole and adjacent the second utility pole.

The method further includes repeating the steps of removing the lashing wire 14 from being around the messenger line 10 and the cable 12, moving the second spiral hanger 44 towards the second utility pole 18, and attaching a successive spiral hanger 44 to the messenger line 10. This repeating may be continued until the spiral hangers 28, 44, and 48 substantially extend across the entirety of the messenger line 10 between the first and second utility poles 16, 18. FIG. 12 depicts a side view schematically depicting a messenger line 10 disposed within the cable 12 attached using the spiral hangers 28, 44, 48 to span between the first and second utility poles 16, 18.

Figure 13:
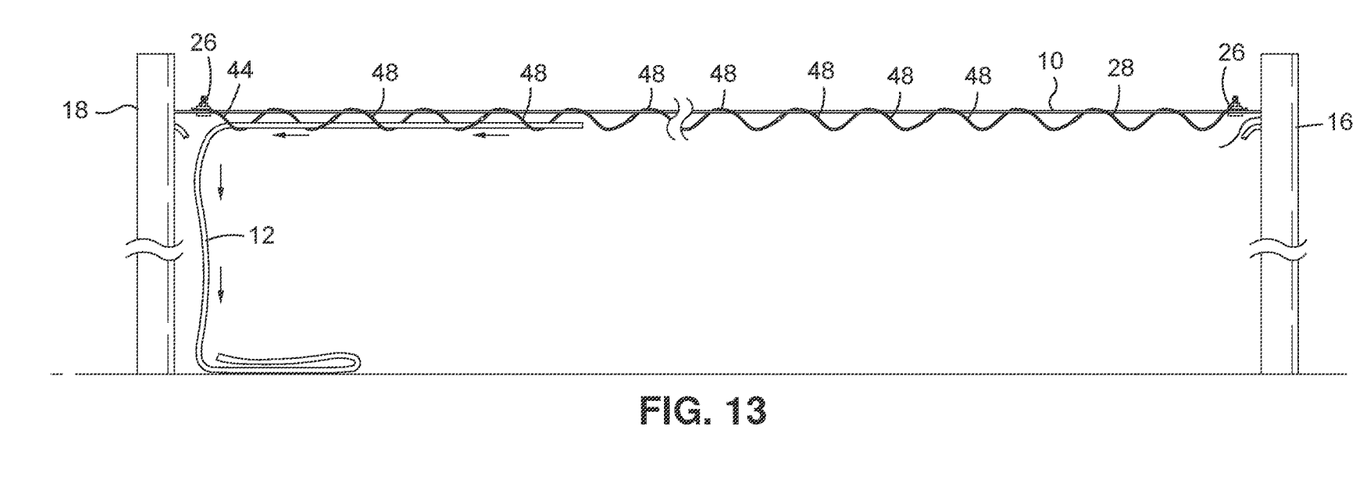
FIG. 13 is a side view similar to FIG. 12 depicting the cable being removed from within the spiral hangers.

Advantageously, the method of this embodiment provides an efficient method of removing the lashing wire 14 while installing the spiral hangers 28, 44, 48 through use of the existing messenger line 10. Because the spiral hangers are incrementally added while the lashing wire is incrementally removed, the existing cable 12 remains located adjacent the messenger line 10 and supported during the entire spiral hanger installation process. Once the spiral hangers 28, 44, 48 are installed, the existing cable 12 may be easily and safely removed by cutting the cable 12 and pulling it from within the spiral hangers 28, 44, 48 at a single location, such as adjacent single utility pole (such as depicted in FIG. 13 with the cable being removed adjacent the second utility pole 18). This provides a safe and effective way to remove an existing cable, such as the cable 12, without having to drop or lower the cable 12 along its installed length (such as the entire distance spanning between the first and second utilities poles 16, 18). Further, where there are multiple existing cables (not depicted), one or more existing cables may be selectively removed while leaving those existing cables that are still in use. Moreover, the method of this embodiment provides an efficient method of installing a new cable 54 while removing an existing cable or cables (such as cable 12) using the existing messenger line 10 while mitigating pole overloading (too much weight on the utilities poles due to multiple cables and lines being attached) and avoiding negatively impacting pole clearance.

In further detail and with reference to FIGS. 5 and 6, as discussed above the method includes removing the lashing wire 14 from being around the messenger line 10 and the cable 12. This may include cutting the lashing wire 14 to form a first lashing wire segment 36 and a second lashing wire segment 38. The first lashing wire segment 36 extends to the second utility pole 18. The second lashing wire segment 38 extends to the first utility pole 16. The removing of the lashing wire 14 may further include attaching a guide line 40 to the messenger line 10 adjacent to the first lashing wire segment 36. A snap ring 42 may be opened and placed about the messenger line 10, and then closed to secure it to the messenger line 10. The guide line 40 may be attached to the snap ring 42. The method may include pulling the guide line 40 to move the first lashing wire segment 36 towards the second utility pole 18. The guide line 40 is pulled such that the snap ring 10 slides along the messenger line 10 towards the second utility pole 18, and the guide line 40 and the snap ring 42 collectively push the lashing wire 14 down line towards the second utility pole 18. This tends to unravel from the messenger line 10 and the cable 12 thereby loosening its grip about the messenger line 10 and the cable 12 in such a region while still providing a degree of vertical support to the cable 12.

If need be the installer 22 can manually supplement the unwinding and removal of the lashing wire 14. Where the lashing wire 14 is unwound to the point where the first lashing wire segment 36 becomes difficult to be continued to be moved downline towards the second utility pole 18, the installer may simply cut and remove a section of the lashing wire 14. Such as may be the case where there is a significant amount of lashing wire 14 and the lashing wire 14 becomes unmanageably tangled (like a "bird's nest").

It is contemplated that the lashing wire 14 may be connected to the messenger line 10 such as through the use of the clamps 26 and the lashing wire 14 may have terminal ends at the clamps 26. In this regard, the removal of the lashing wire 14 from about the messenger line 10 and the cable 12 may not need to be cut, but may simply be detached by loosening the clamp 26 such as adjacent the first utility pole 16. Moreover, it is contemplated that the lashing wire 14 may be composed of multiple segments and not necessarily a single continuous piece of material extending from adjacent the first utility pole 16 to adjacent the second utility pole 18. As such the removal of the lashing wire 14 may entail removal of various segments of the lashing wire 14. Referring to FIGS. 8 and 9, it is contemplated that the second spiral hanger 44 may also assist in removing the lashing wire 14 from about the messenger line 10. The installer 22 may push or otherwise move the second spiral hanger 44 towards the first lashing wire segment 36. The second spiral hanger 28 may directly push the first lashing wire segment 36 and/or the snap ring 42 towards the second utility pole 18.

With reference to FIG. 6, the first spiral hanger 28 may be attached to the messenger line 10 by directly affixing the first spiral hanger 28 to the messenger line 10, such as through the use of the clamp 26. The second end 32 of the first spiral hanger 28 is attached to the messenger line 10. The clamp 26 which as previously used with the removed lashing wire 14 may be reused. Although a different clamp or other fastener may be used.

The spiral hangers 28, 44, 48 may be attached to each other. In this regard, the method of installing the spiral hangers 28, 44, 48 may further include attaching respective adjacent spiral hangers 28, 44, 48 to each other. With reference to FIG. 11, the first end 30 of the first spiral hanger 28 is attached with the second end of the successive spiral hanger 48. In the embodiment depicted, the first and second ends 30, 32 are formed with complementary connectors so as to allow for the first end 30 to be engaged with the second end 32 by simply pressing and snapping them together. It is contemplated that other attachment techniques may be used, such as with the use of a crimp sleeve with abutting ends being joined by a crimped sleeve.

The removing of the lashing wire 14, the moving of the second spiral hanger 44, and the attaching of a successive spiral hanger 48 may repeatedly continue until the spiral hangers 28, 44, 48 substantially extend across the entirety of the messenger line 10 between the first and second utility poles 16, 18. In this regard, the second spiral hanger 44 may be moved to the left towards the second utility pole 18 to form another gap along the messenger line between the second spiral hanger 44 and the successive spiral hanger 48. This provides room for another successive spiral hanger 48 to be wound about the messenger line 10 and connected to the adjacent previously installed successive spiral hanger 48. FIG. 12 depicts the spiral hangers 28, 44, 48 extending between the first and second utility poles 16, 18 with all of spiral hangers 28, 44, 48 being connected to each other to form a continuous spiral. The first end 30 of the second spiral hanger 44 is directly affixed to the messenger line 10 using the clamp 26. With the completion of this installation of the spiral hangers 28, 44, 48 an aerial or open air conduit is formed between the first and second utility poles 16, 18.

The method of installing spiral hangers 28, 44, 48 may further include removing the cable 12 between the first and second utility poles 16, 18 from within the spiral hangers 28, 44, 48. As depicted in FIG. 12, the cable 12 is cut adjacent the first utility pole 16 and cut adjacent the second utility pole 18. FIG. 13 is the side view similar to FIG. 12 depicting the cable 12 being removed from within the spiral hangers 28, 44, 48. The removing of the cable 12 may include pulling the cable 12 to slide the cable 12 along and within the spiral hangers 28, 44, 48 towards a respective one of the first or second utility poles 16, 18 (the second utility pole 18 in the example depicted). The cable 12 depicted as being lowered to the ground adjacent the second utility pole 18. Though not depicted, it is contemplated that the cable 12 may be directly spooled onto a reel which may be used to pull the cable while storing it. This cable removal process is completed to have increased safety from personal injury and property damage as the cable is deposited in a single location. This is in comparison where the cable 12 is allowed to be dropped along its deployed length between the first and second utility poles 16, 18.

Figure 14:
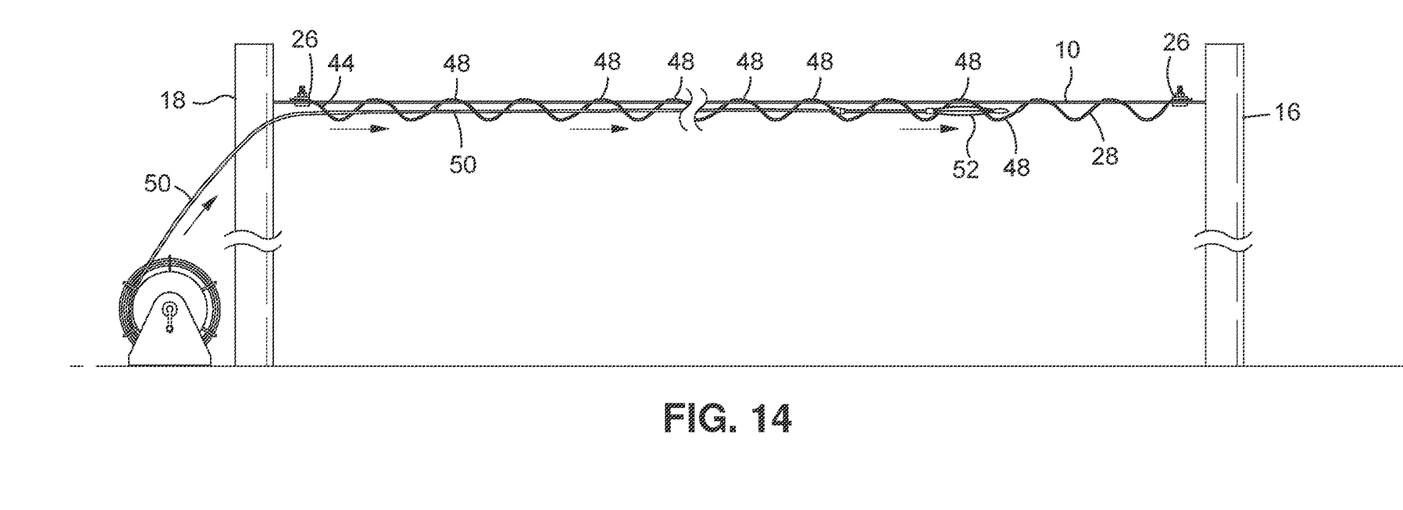
FIG. 14 is a side view similar to FIG. 13 depicting a rodder being inserted through the spiral hangers with a rodder guide tool.

The method of installing spiral hangers 28, 44, 48 may further include installing a second cable 54 within the spiral hangers 28, 44, 48 between the first and second utility poles 16, 18. FIG. 14 is the side view similar to FIG. 13, however, with the cable 12 being removed there is depicted a rodder 50 being inserted through the spiral hangers 44, 48. The rodder 50 is an elongate flexibly rigid tool. A rodder guide tool 52 may be affixed to the end of the rodder 50 to facilitate of smooth deployment of the rodder 50 through the spiral hangers 28, 44, 48 from adjacent the second spiral hanger 18 to the first spiral hanger 16. Upon the rodder 50 reaching the region adjacent the first utility pole 16, the rodder guide tool 52 may be removed. The rodder guide tool 52 may be slipped through the windings of the first spiral hanger 28 and set aside.

Figure 15:
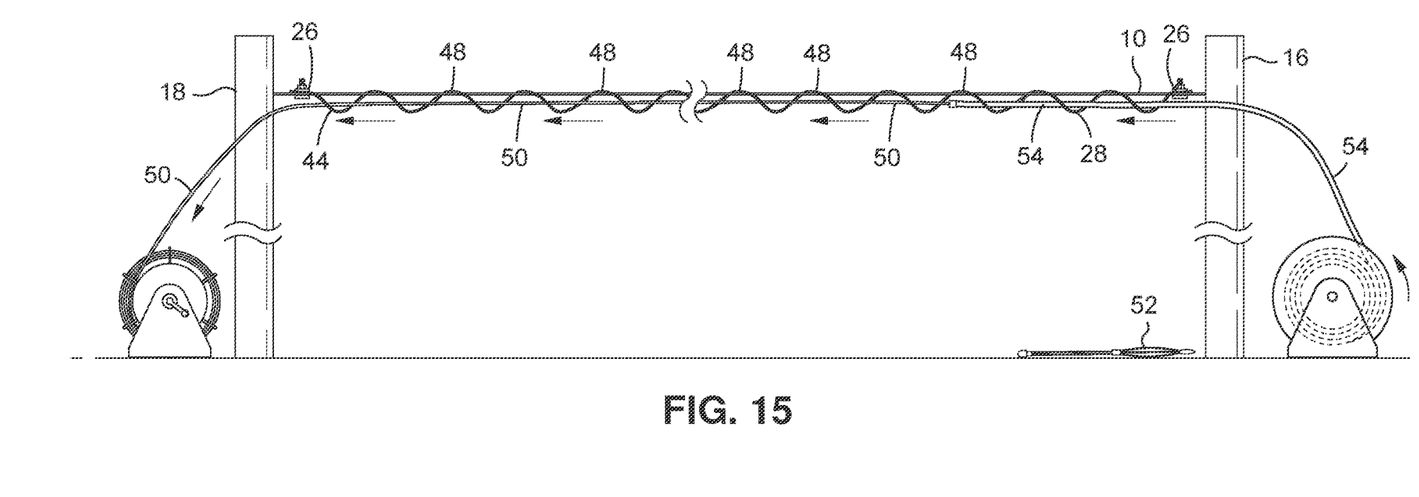
FIG. 15 is a side view similar to FIG. 14 with the rodder being removed with an attached new cable.

Referring now to FIG. 15, the new second cable 54 may be temporarily attached to the end of the rodder 50. The rodder 50 may then be pulled back towards the second utility pole 18, such as by reeling it in. This also pulls the new second cable 54 into and through the installed spiral hangers 28, 44, 48 for installation of the new second cable 54 with the messenger line 12 between the first and second utility poles 16, 18.

The particulars shown herein are by way of example only for purposes of illustrative discussion, and are presented in the cause of providing what is believed to be the most useful and readily understood description of the principles and conceptual aspects of the various embodiments set forth in the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A method of installing spiral hangers about a messenger line installed between first and second utility poles, a cable being lashed to the messenger line with a lashing wire wrapped about the cable and the messenger line extending from the first utility pole to the second utility pole, the method comprising the steps of:
   (a) attaching a first spiral hanger to the messenger line between the first utility pole and the second utility pole with the first spiral hanger disposed about the messenger line and the cable;
   (b) attaching a successive spiral hanger to the messenger line between the first spiral hanger and the second utility pole with the successive spiral hanger disposed about the messenger line and the cable;
   (c) cutting the lashing wire to form a first lashing wire segment and a second lashing wire segment, the first lashing wire segment extending to the second utility pole, the second lashing wire segment extending to the first utility pole, and gradually removing the lashing wire from being around the messenger line and the cable adjacent the successive spiral hanger between the successive spiral hanger and the second utility pole by moving the first lashing wire segment towards the second utility pole; and
   (d) repeating steps (b) and (c) until the spiral hangers substantially extend across the entirety of the messenger line between the first and second utility poles, and attaching respective adjacent spiral hangers to each other.

2. The method of installing spiral hangers of claim 1, wherein step (c) further includes:
   attaching a guide line to the messenger line adjacent to the first lashing wire segment; and
   pulling the guide line to move the first lashing wire segment towards the second utility pole.

3. The method of installing spiral hangers of claim 1 further includes the step of:
   (e) removing the cable between the first and second utility poles from within the spiral hangers.

4. The method of installing spiral hangers of claim 3 wherein step (e) includes:
   pulling the cable to slide the cable along and within the spiral hangers towards a respective one of the first or second utility poles.

5. The method of installing spiral hangers of claim 1 further includes the step of:
   (f) installing a second cable within the spiral hangers between the first and second utility poles.

6. A method of installing spiral hangers about a messenger line installed between first and second utility poles, a cable being lashed to the messenger line with a lashing wire wrapped about the cable and the messenger line extending from the first utility pole to the second utility pole, the method comprising the steps of:
   (a) attaching a first spiral hanger to the messenger line between the first utility pole and the second utility pole with the first spiral hanger disposed about the messenger line and the cable;
   (b) attaching a successive spiral hanger to the messenger line between the first spiral hanger and the second utility pole with the successive spiral hanger disposed about the messenger line and the cable;
   (c) gradually removing the lashing wire from being around the messenger line and the cable adjacent the successive spiral hanger between the successive spiral hanger and the second utility pole;
   (d) repeating steps (b) and (c) until the spiral hangers substantially extend across the entirety of the messenger line between the first and second utility poles, and attaching respective adjacent spiral hangers to each other; and
   (e) removing the cable between the first and second utility poles from within the spiral hangers.

7. A method of installing spiral hangers about a messenger line installed between first and second utility poles, a cable being lashed to the messenger line with a lashing wire wrapped about the cable and the messenger line extending from the first utility pole to the second utility pole, the method comprising the steps of:
- (a) attaching a first spiral hanger to the messenger line between the first utility pole and the second utility pole with the first spiral hanger disposed about the messenger line and the cable;
- (b) attaching a successive spiral hanger to the messenger line between the first spiral hanger and the second utility pole with the successive spiral hanger disposed about the messenger line and the cable;
- (c) gradually removing the lashing wire from being around the messenger line and the cable adjacent the successive spiral hanger between the successive spiral hanger and the second utility pole;
- (d) repeating steps (b) and (c) until the spiral hangers substantially extend across the entirety of the messenger line between the first and second utility poles, and attaching respective adjacent spiral hangers to each other; and
- (f) installing a second cable within the spiral hangers between the first and second utility poles.

\* \* \* \* \*